United States Patent
Koiranen et al.

(10) Patent No.: US 11,141,679 B2
(45) Date of Patent: Oct. 12, 2021

(54) ULTRASOUND CRYSTALLIZATION DEVICE AND AN ULTRASOUND CRYSTALLIZATION SYSTEM

(71) Applicant: Lappeenrannan-Lahden teknillinen yliopisto LUT, Lappeenranta (FI)

(72) Inventors: Tuomas Koiranen, Lappeenranta (FI); Bjarne Ekberg, Lappeenranta (FI); Antti Häkkinen, Lappeenranta (FI); Juha Varis, Lappeenranta (FI); Marjatta Louhi-Kultanen, Lappeenranta (FI)

(73) Assignee: LAPPEENRANNAN-LAHDEN TEKNILLINEN YLIOPISTO LUT, Lappeenranta (FI)

( * ) Notice: Subject to any disclaimer, the term of this patent is extended or adjusted under 35 U.S.C. 154(b) by 145 days.

(21) Appl. No.: 16/463,181

(22) PCT Filed: Nov. 20, 2017

(86) PCT No.: PCT/FI2017/050794
§ 371 (c)(1),
(2) Date: May 22, 2019

(87) PCT Pub. No.: WO2018/096205
PCT Pub. Date: May 31, 2018

(65) Prior Publication Data
US 2019/0374872 A1    Dec. 12, 2019

(30) Foreign Application Priority Data
Nov. 22, 2016   (FI) ..................... 20165885

(51) Int. Cl.
*B01D 9/00*     (2006.01)

(52) U.S. Cl.
CPC ......... *B01D 9/0081* (2013.01); *B01D 9/0068* (2013.01); *B01D 9/005* (2013.01); *B01D 9/0013* (2013.01)

(58) Field of Classification Search
None
See application file for complete search history.

(56) References Cited

U.S. PATENT DOCUMENTS

| | | |
|---|---|---|
| 3,513,212 A | 5/1970 | Skrebowski et al. |
| 2013/0040141 A1 | 2/2013 | Grawe et al. |

FOREIGN PATENT DOCUMENTS

| | | |
|---|---|---|
| EP | 1 375 432 | 1/2004 |
| GB | 742 891 | 1/1956 |

(Continued)

OTHER PUBLICATIONS

International Search Report, PCT/FI2017/050794, dated Mar. 5, 2018.
Written Opinion, PCT/FI2017/050794, dated Mar. 5, 2018.

*Primary Examiner* — Jelitza M Perez
(74) *Attorney, Agent, or Firm* — Nixon & Vanderhye

(57) ABSTRACT

An ultrasound crystallization device includes a tubular crystallization reactor (102) for conducting process fluid containing substance to be crystallized, an ultrasound source (104) for radiating ultrasound to the tubular crystallization reactor, and a temperature-control structure (105) for controlling the temperature of the process fluid with the aid of temperature-control fluid. The tubular crystallization reactor is shaped to conduct the process fluid to flow around the ultrasound source, and the temperature-control structure comprises a flow-guide structure (106) for guiding at least a part of the temperature-control fluid to flow around the ultrasound source. The flow-guide structure improves the accuracy of the temperature control of the process fluid and (Continued)

also the ability of the temperature control to react to changes.

19 Claims, 5 Drawing Sheets

(56) References Cited

FOREIGN PATENT DOCUMENTS

| | | | | |
|---|---|---|---|---|
| GB | 742891 A * | 1/1956 | ........... | B01D 9/0013 |
| JP | 2009-219947 | 10/2009 | | |
| WO | WO 92/20420 | 11/1992 | | |
| WO | WO-9220420 A1 * | 11/1992 | ............... | A23G 9/08 |
| WO | WO 2010/079350 | 7/2010 | | |
| WO | WO 2011/124515 | 10/2011 | | |
| WO | WO 2016/107968 | 7/2016 | | |

* cited by examiner

ULTRASOUND CRYSTALLIZATION DEVICE AND AN ULTRASOUND CRYSTALLIZATION SYSTEM

FIELD OF THE DISCLOSURE

The disclosure relates generally to ultrasound crystallization. More particularly, the disclosure relates to an ultrasound crystallization device and to an ultrasound crystallization system comprising one or more ultrasound crystallization devices.

BACKGROUND

Ultrasound crystallization is a crystallization process where ultrasound is applied to process fluid that contains substance to be crystallized. Mechanisms and advantages of the ultrasound crystallization are discussed for example in publication: John Dodds et al.: *The Effect of Ultrasound on Crystallization-Precipitation Processes: Some Examples and a New Segregation Model*, WILEY-VCH Verlag GmbH & Co. KGaA, Weinheim, 2007. In many cases, the application of ultrasound reduces the induction time, narrows the width of the metastable zone, and leads to production of finer and more uniform crystals. For example in pharmaceutical industry, the ultrasound crystallization is suitable for implementing continuous crystallization processes. An ultrasonic crystallization device that is suitable for a continuous crystallization process comprises typically a tubular crystallization reactor arranged to conduct a flow of process fluid that contains substance to be crystallized. Furthermore, the ultrasonic crystallization device comprises an ultrasound source for radiating ultrasound to the tubular crystallization reactor and a temperature-control structure for controlling the temperature of the process fluid so that the process fluid is in heat transfer relation with temperature-control fluid. The temperature-control fluid can be for example water.

In many ultrasound crystallization processes, the temperature of the process fluid plays a significant role because for example the solubility of the substance being crystallized depends on the temperature. Therefore, there is a need to control the temperature of the process fluid so that the temperature control is sufficiently accurate and sufficiently capable of reacting to changes. Publication WO2011124515 describes an arrangement where a helix-shaped tube for conducting process fluid is immersed into cooling liquid for controlling the temperature of the process fluid. This approach is, however, not free from challenges related to the accuracy of the temperature control and/or to a need to react to changes.

SUMMARY

The following presents a simplified summary in order to provide a basic understanding of some embodiments of the invention. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new ultrasound crystallization device that is suitable for a continuous crystallization process. The ultrasound crystallization device can be, for example but not necessarily, a part of process equipment in pharmaceutical or chemical industry.

The ultrasound crystallization device can be used for e.g. production of powders of medicament by crystallization from supersaturated process fluid that contains the above-mentioned medicament.

An ultrasound crystallization device according to the invention comprises:
- an inlet for receiving a flow of process fluid containing substance to be crystallized,
- a tubular crystallization reactor arranged to conduct the process fluid between the inlet and an outlet of the crystallization device,
- an ultrasound source for radiating ultrasound to the tubular crystallization reactor, and
- a temperature-control structure for controlling the temperature of the process fluid so that the process fluid is in heat transfer relation with temperature-control fluid, e.g. water.

The tubular crystallization reactor is shaped to conduct the process fluid to flow around the ultrasound source so that a flow path of the process fluid is circulated around the ultrasound source, and the temperature-control structure comprises a flow-guide structure for guiding at least a part of the temperature-control fluid to flow around the ultrasound source so that a flow path of the at least part of the temperature-control fluid is circulated around the ultrasound source. The tubular crystallization reactor can be, for example but not necessarily, a helix-shaped tube surrounding the ultrasound source. The temperature-control structure may comprise, for example but not necessarily, a container encompassing the tubular crystallization reactor and the ultrasound source, and the flow-guide structure may comprise, for example but not necessarily, a helical flow-guide plate attached to the inner wall of the container and surrounding the tubular crystallization reactor.

As both the process fluid and the temperature-control fluid are guided to flow around the ultrasound source, the heat transfer between the process fluid and the temperature-control fluid is more controllable than e.g. in a case where the tubular crystallization reactor is immersed into temperature-control fluid. Therefore, the temperature of the process fluid can be controlled more accurately and the temperature control is more capable of reacting to changes.

In accordance with the invention, there is provided also a new ultrasound crystallization system that can be, for example but not necessarily, a part of process equipment in pharmaceutical or chemical industry.

An ultrasound crystallization system according to the invention comprises:
- one or more ultrasound crystallization devices according to the invention, and
- a temperature-control system for pumping temperature-control fluid through the temperature-control structure of each of the one or more ultrasound crystallization devices.

In an exemplifying case where there are two or more ultrasound crystallization devices, the ultrasound crystallization devices can be series connected so that the outlet of a first one of the ultrasound crystallization devices is connected to the inlet of a second one of the ultrasound crystallization devices. It is, however, also possible that an ultrasound crystallization system according to an exemplifying and non-limiting embodiment of the invention comprises parallel connected ultrasound crystallization devices, series connected groups of parallel connected ultrasound crystallization devices, parallel connected groups of series connected ultrasound crystallization devices, or any other interconnection of ultrasound crystallization devices.

Various exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in conjunction with the accompanying drawings.

The verbs "to comprise" and "to include" are used in this document as open limitations that neither exclude nor require the existence of also un-recited features. The features recited in the accompanied dependent claims are mutually freely combinable unless otherwise explicitly stated. Furthermore, it is to be understood that the use of "a" or "an", i.e. a singular form, throughout this document does as such not exclude a plurality.

BRIEF DESCRIPTION OF THE FIGURES

Exemplifying and non-limiting embodiments of the invention and their advantages are explained in greater details below in the sense of examples and with reference to the accompanying drawings, in which.

DESCRIPTION OF EXEMPLIFYING EMBODIMENTS

The specific examples provided in the description below should not be construed as limiting the scope and/or the applicability of the accompanied claims. Lists and groups of examples provided in the description are not exhaustive unless otherwise explicitly stated.

Figure 1:
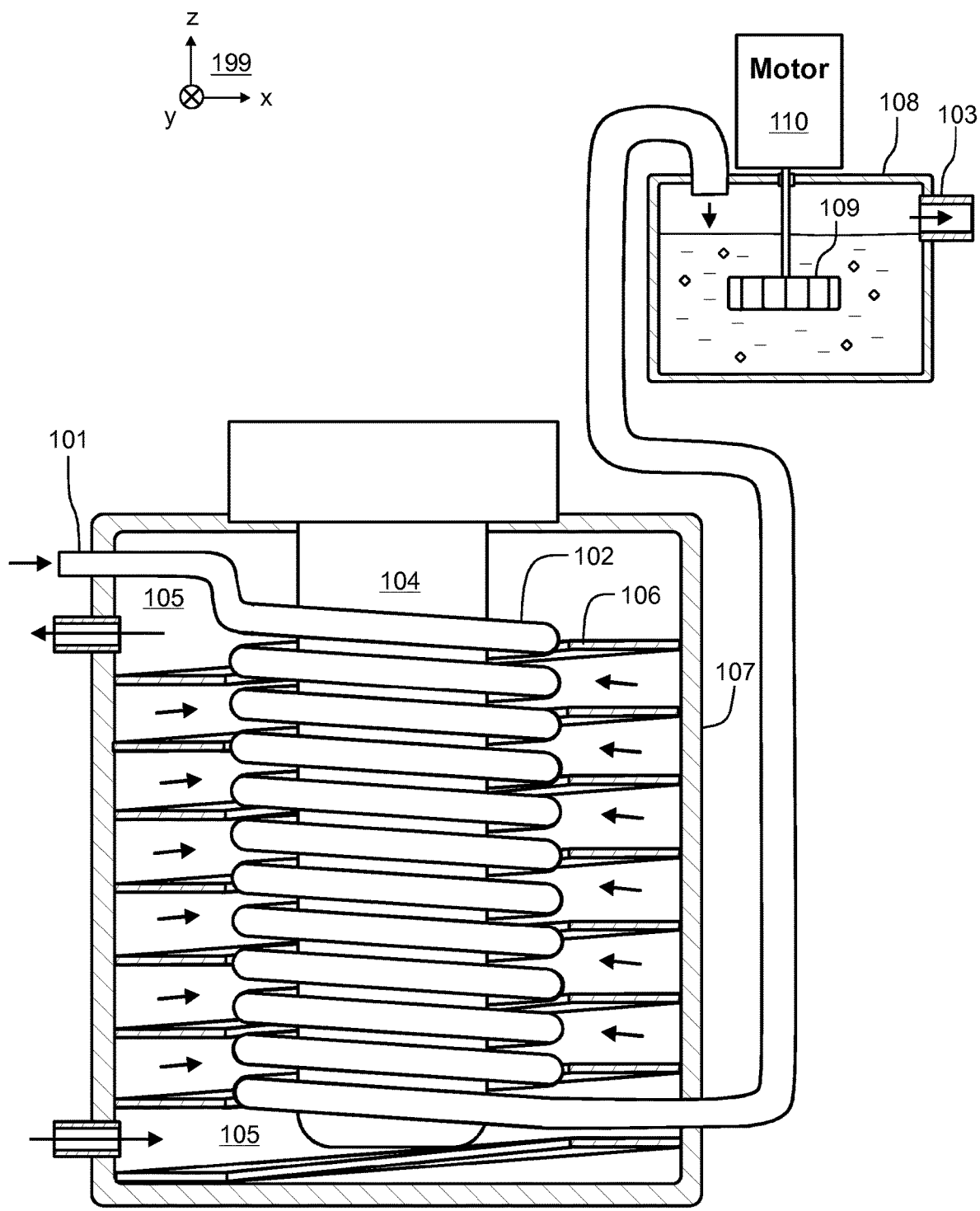
FIG. 1 illustrates an ultrasound crystallization device according to an exemplifying and non-limiting embodiment of the invention.

FIG. 1 illustrates an ultrasound crystallization device according to an exemplifying and non-limiting embodiment of the invention. The ultrasound crystallization device comprises an inlet 101 for receiving a flow of process fluid that contains substance to be crystallized. The process fluid can be e.g. supersaturated fluid containing medicament to be crystallized. The ultrasound crystallization device comprises a tubular crystallization reactor 102 arranged to conduct the process fluid between the inlet and an outlet 103 of the crystallization device. The ultrasound crystallization device comprises an ultrasound source 104 for radiating ultrasound to the tubular crystallization reactor 102 so as to apply ultrasound to the process fluid that flows in the tubular crystallization reactor 102.

The frequency of the ultrasound can be for example from 16 kHz to 100 kHz, and more preferably from 20 kHz to 40 kHz. The ultrasound can be applied on the tubular crystallization reactor 102 continuously or periodically so that the ultrasound source 104 is periodically switched ON and OFF. The ultrasound source 104 can be OFF e.g. 0-50% of the processing time. An ultrasound crystallization device according to an exemplifying and non-limiting embodiment of the invention comprises an ultrasound controller 150 for periodically switching the ultrasound source 104 ON and OFF. The temporal lengths of the ON- and OFF- periods are preferably changeable with the aid of one or more setting parameters.

The ultrasound crystallization device comprises a temperature-control structure 105 for controlling temperature of the process fluid so that the process fluid is in heat transfer relation with temperature-control fluid. The temperature-control fluid can be for example water. The temperature-control structure 105 comprises a flow-guide structure 106 for guiding at least a part of the temperature-control fluid to circulate around the ultrasound source.

In the exemplifying ultrasound crystallization device illustrated in FIG. 1, the tubular crystallization reactor 102 is a helix-shaped tube surrounding the ultrasound source 104 so that the process fluid is conducted to circulate around the ultrasound source 104. The temperature-control structure 105 comprises a container 107 encompassing the tubular crystallization reactor 102 and the ultrasound source 104. In this exemplifying ultrasound crystallization device, the flow-guide structure 106 is a helical guide-plate attached to the inner wall of the container 107 and arranged to surround the tubular crystallization reactor 102. In FIG. 1, the container 107 and the flow-guide structure 106 are presented as section views where the section plane is parallel with the xz-plane of a coordinate system 199. As illustrated with arrows in FIG. 1, the flow-guide structure 106 guides at least a part of the temperature-control fluid to flow along a helical path surrounding the ultrasound source 104 and the tubular crystallization reactor 102.

In the exemplifying ultrasound crystallization device illustrated in FIG. 1, the ultrasound source 104 is cylindrical and arranged to radiate the ultrasound via the girthed area of the cylindrical ultrasound source. The ultrasound source 104 can be, for example but not necessarily, a cylindrical rod that oscillates in its longitudinal direction at its resonance frequency and radiates ultrasound in radial directions of the cylindrical rod via the girthed area of the cylindrical rod. In this context the "girthed area" is a geometric concept that relates to a cylindrical shape. The tubular crystallization reactor 102 surrounds the girthed area of the cylindrical ultrasound source so that the tubular crystallization reactor 102 is arranged to conduct the process fluid substantially parallel with the girthed area of the cylindrical ultrasound source and a distance away from the girthed area of the cylindrical ultrasound source. In an ultrasound crystallization device according to an exemplifying and non-limiting embodiment of the invention, the transmission intensity of the ultrasound is substantially uniform on the girthed area of the cylindrical ultrasound source 104. In this exemplifying ultrasound crystallization device, the intensity of the ultrasound is substantially uniform along the flowing direction of the process fluid in the tubular crystallization reactor 102.

The exemplifying ultrasound crystallization device illustrated in FIG. 1 further comprises a stabilizer tank 108 between the tubular crystallization reactor 102 and the outlet 103 of the ultrasound crystallization device. The ultrasound crystallization device may further comprise a mixer 109 for stirring the process fluid contained by the stabilizer tank 108. The mixer 109 can be operated with e.g. an electric motor 110. The stabilizer tank 108 can be used for setting the scene for e.g. Ostwald ripening where smaller crystals dissolve and the dissolved substance deposits on the surfaces of larger crystals.

Figure 2:
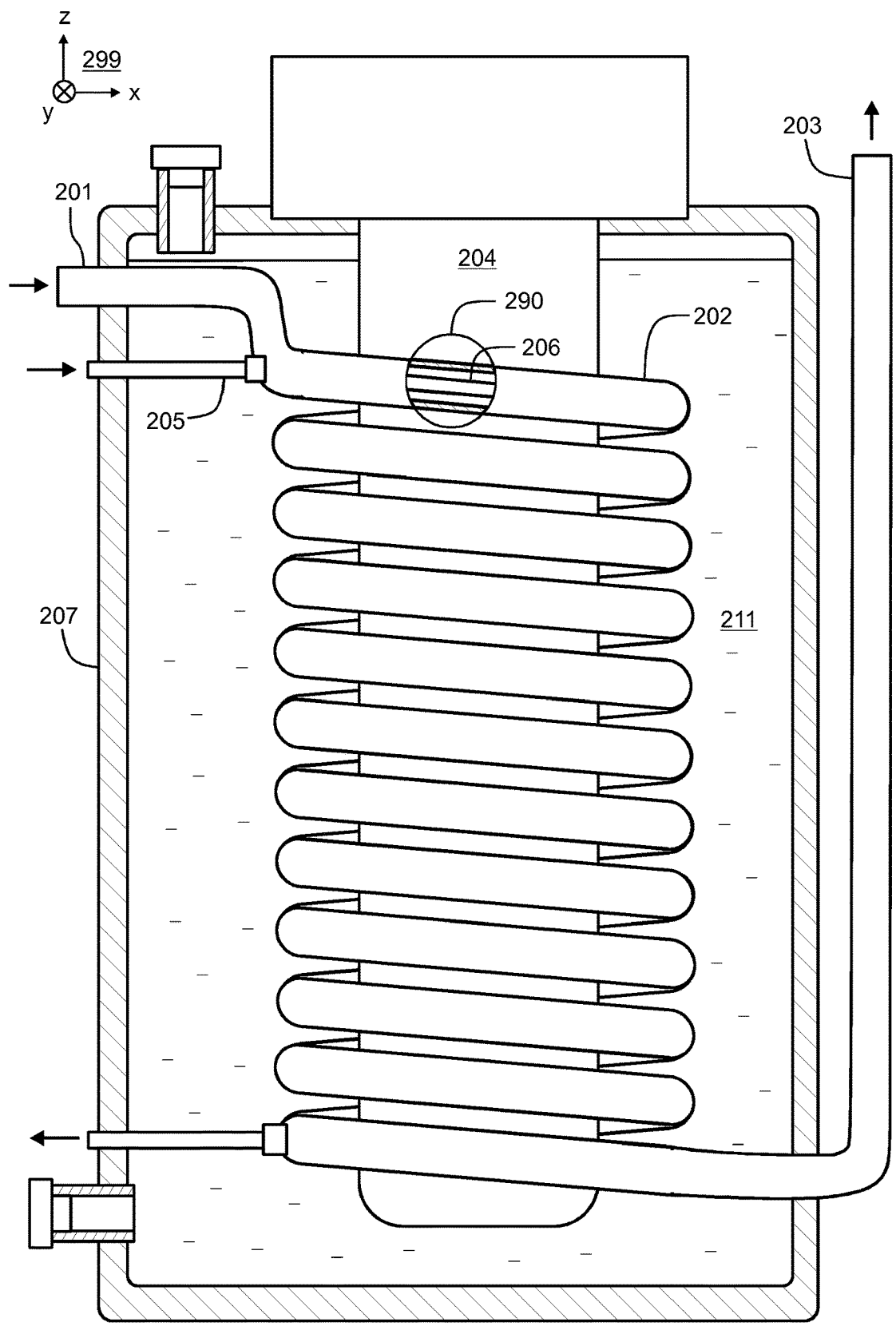
FIG. 2 illustrates an ultrasound crystallization device according to an exemplifying and non-limiting embodiment of the invention.

FIG. 2 illustrates an ultrasound crystallization device according to an exemplifying and non-limiting embodiment of the invention. The ultrasound crystallization device comprises an inlet 201 for receiving a flow of process fluid that contains substance to be crystallized. The ultrasound crystallization device comprises a tubular crystallization reactor 202 arranged to conduct the process fluid between the inlet and an outlet 203 of the crystallization device. The ultrasound crystallization device comprises an ultrasound source 204 for radiating ultrasound to the tubular crystallization reactor 202 so as to apply ultrasound to the process fluid that flows in the tubular crystallization reactor 202. The ultrasound crystallization device comprises a temperature-control structure 205 for controlling temperature of the process fluid so that the process fluid is in heat transfer relation with temperature-control fluid. The temperature-control structure 205 comprises a flow-guide structure 206 for guiding the temperature-control fluid to circulate around the ultrasound source.

In the exemplifying ultrasound crystallization device illustrated in FIG. 2, the tubular crystallization reactor 202 is a helix-shaped tube surrounding the ultrasound source 204 so that the process fluid is conducted to circulate around the ultrasound source 204. The flow-guide structure 206 is a heat control pipe that is inside the tubular crystallization reactor 202 and that is suitable for conducting the temperature-control fluid. A part of the flow-guide structure 206 is shown in a partial section view 290. The ultrasound crystallization device comprises a container 207 encompassing the tubular crystallization reactor 202, the temperature-control structure 205, and the ultrasound source 204. The container 207 contains liquid 211 for conducting ultrasound from the ultrasound source 204 to the tubular crystallization reactor 202. In FIG. 2, the container 207 is presented as a section view where the section plane is parallel with the xz-plane of a coordinate system 299. The ultrasound crystallization device illustrated in FIG. 2 can be provided with a stabilizer tank in the same way as the ultrasound crystallization device illustrated in FIG. 1 is provided with the stabilizer tank 108.

Figure 3:
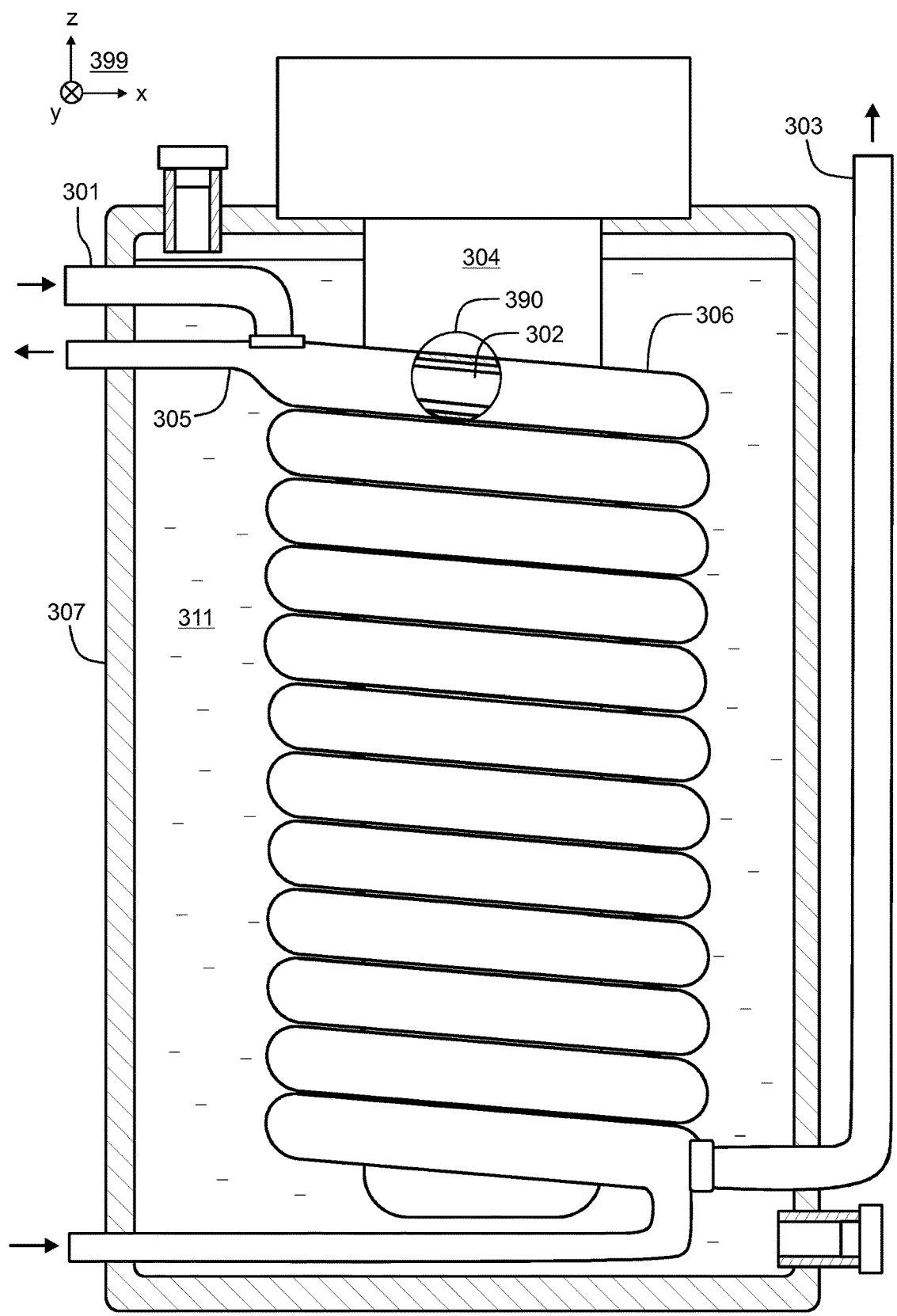
FIG. 3 illustrates an ultrasound crystallization device according to an exemplifying and non-limiting embodiment of the invention.

FIG. 3 illustrates an ultrasound crystallization device according to an exemplifying and non-limiting embodiment of the invention. The ultrasound crystallization device comprises an inlet 301 for receiving a flow of process fluid that contains substance to be crystallized. The ultrasound crystallization device comprises a tubular crystallization reactor 302 arranged to conduct the process fluid between the inlet and an outlet 303 of the crystallization device. A part of the tubular crystallization reactor 302 is shown in a partial section view 390. The ultrasound crystallization device comprises an ultrasound source 304 for radiating ultrasound to the tubular crystallization reactor 302 so as to apply ultrasound to the process fluid that flows in the tubular crystallization reactor 302. The ultrasound crystallization device comprises a temperature-control structure 305 for controlling temperature of the process fluid so that the process fluid is in heat transfer relation with temperature-control fluid. The temperature-control structure 305 comprises a flow-guide structure 306 for guiding the temperature-control fluid to circulate around the ultrasound source.

In the exemplifying ultrasound crystallization device illustrated in FIG. 3, the tubular crystallization reactor 302 is a helix-shaped tube surrounding the ultrasound source 304 so that the process fluid is conducted to circulate around the ultrasound source 304. The flow-guide structure 306 is a heat control pipe inside which the tubular crystallization reactor 302 is located and which is suitable for conducting the temperature-control fluid. The ultrasound crystallization device comprises a container 307 encompassing the tubular crystallization reactor 302, the temperature-control structure 305, and the ultrasound source 304. The container 307 contains liquid 311 for conducting ultrasound from the ultrasound source 304 to the flow-guide structure 306 and thereby to the tubular crystallization reactor 302. In FIG. 3, the container 307 is presented as a section view where the section plane is parallel with the xz-plane of a coordinate system 399. The ultrasound crystallization device illustrated in FIG. 3 can be provided with a stabilizer tank in the same way as the ultrasound crystallization device illustrated in FIG. 1 is provided with the stabilizer tank 108.

Figure 4:
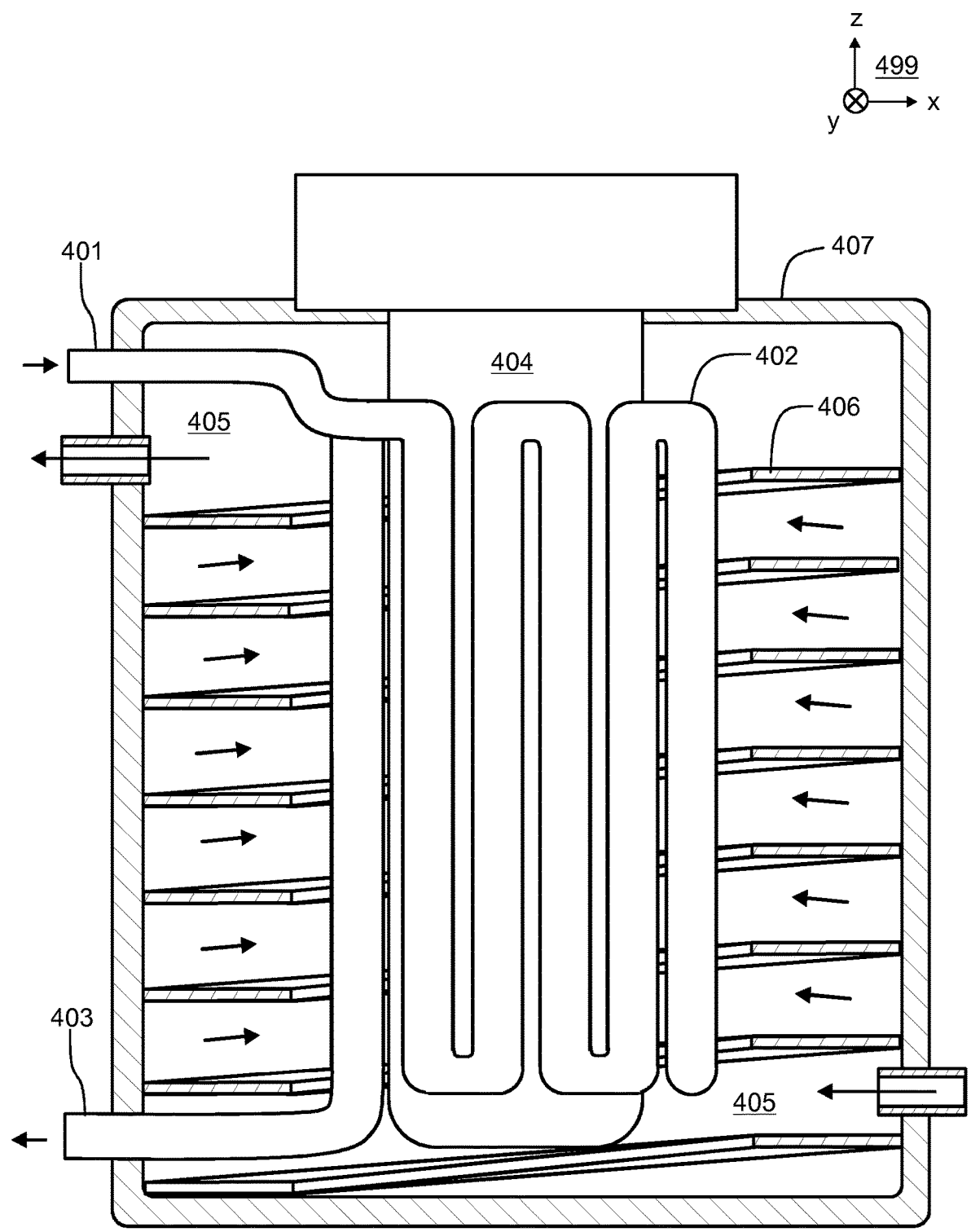
FIG. 4 illustrates an ultrasound crystallization device according to an exemplifying and non-limiting embodiment of the invention.

FIG. 4 illustrates an ultrasound crystallization device according to an exemplifying and non-limiting embodiment of the invention. The ultrasound crystallization device comprises an inlet 401 for receiving a flow of process fluid that contains substance to be crystallized. The ultrasound crystallization device comprises a tubular crystallization reactor 402 arranged to conduct the process fluid between the inlet and an outlet 403 of the crystallization device. The ultrasound crystallization device comprises an ultrasound source 404 for radiating ultrasound to the tubular crystallization reactor 402 so as to apply ultrasound to the process fluid that flows in the tubular crystallization reactor 402. The ultrasound crystallization device comprises a temperature-control structure 405 for controlling temperature of the process fluid so that the process fluid is in heat transfer relation with temperature-control fluid. The temperature-control structure 405 comprises a flow-guide structure 406 for guiding at least a part of the temperature-control fluid to flow around the ultrasound source.

In the exemplifying ultrasound crystallization device illustrated in FIG. 4, the tubular crystallization reactor 402 is a meandering tube surrounding the ultrasound source 404 so that the process fluid is conducted to flow around the ultrasound source 404. The temperature-control structure 405 comprises a container 407 encompassing the tubular crystallization reactor 402 and the ultrasound source 404. In this exemplifying ultrasound crystallization device, the flow-guide structure 406 of the temperature-control structure 405 is a helical guide-plate attached to the inner wall of the container 407 and arranged to surround the tubular crystallization reactor 402. In FIG. 4, the container 407 and the flow-guide structure 406 are presented as section views where the section plane is parallel with the xz-plane of a coordinate system 499. As illustrated with arrows in FIG. 4, the flow-guide structure 406 guides at least a part of the temperature-control fluid to flow along a helical path surrounding the ultrasound source 404 and the tubular crystallization reactor 402. As the temperature-control fluid flows along the helical path and the process fluid flows along a meandering path defined by the tubular crystallization reactor 402, it is possible to arrange circumstances where the temperature decreases and increases alternately on the flowing path defined by the tubular crystallization reactor 402. The ultrasound crystallization device illustrated in FIG. 4 can be provided with a stabilizer tank in the same way as the ultrasound crystallization device illustrated in FIG. 1 is provided with the stabilizer tank 108.

Figure 5:
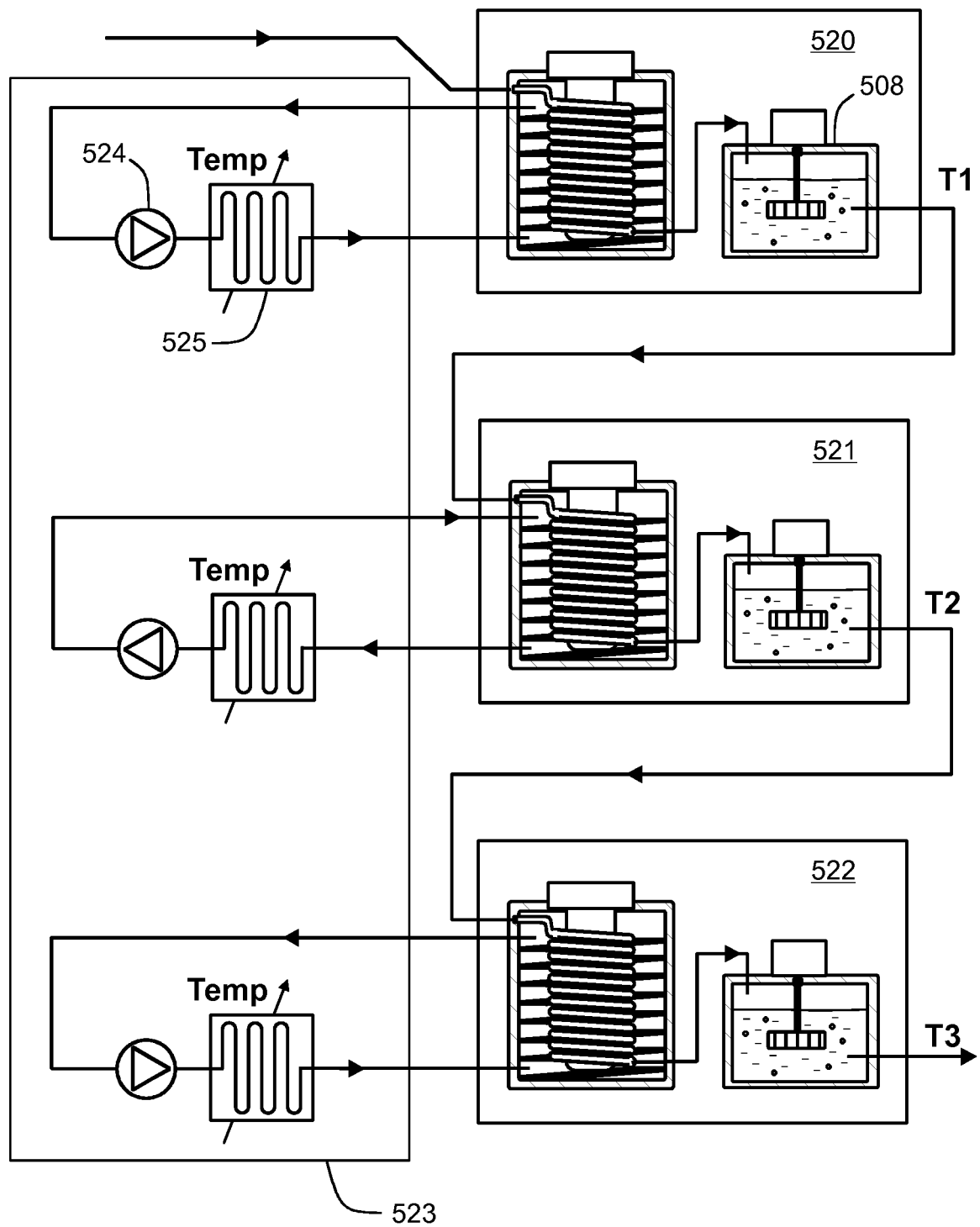
FIG. 5 illustrates an ultrasound crystallization system according to an exemplifying and non-limiting embodiment of the invention.

FIG. 5 illustrates an ultrasound crystallization system according to an exemplifying and non-limiting embodiment of the invention. The ultrasound crystallization system comprises ultrasound crystallization devices 520, 521, and 522.

In this exemplifying case, each of the ultrasound crystallization devices 520-522 is similar to the ultrasound crystallization device illustrated in FIG. 1. It is, however, also possible that one or more of the ultrasound crystallization devices 520-522 is different from the ultrasound crystallization device illustrated in FIG. 1. For example, one or more of the ultrasound crystallization devices 520-522 can be similar to one or more of the ultrasound crystallization devices illustrated in FIGS. 2, 3, and 4. The ultrasound crystallization system comprises a temperature-control system 523 for pumping temperature-control fluid through the temperature-control structures of the ultrasound crystallization devices 520-522. The temperature-control system 523 comprises pumps and temperature-control units. In FIG. 5, the pump for circulating temperature-control fluid through the temperature-control structure of the ultrasound crystallization device 520 is denoted with a reference 524 and the temperature-control unit for controlling the temperature of the ultrasound crystallization device 520 is denoted with a reference 525. Furthermore, the temperature-control system 523 may comprise other elements such as for example temperature sensors and a controller for controlling the pumps and the temperature-control units. The temperature sensors and the controller are not shown in FIG. 5.

In the exemplifying ultrasound crystallization system illustrated in FIG. 5, the ultrasound crystallization devices 520-522 are series connected so that the outlet of the ultrasound crystallization device 520 is connected to the inlet of the ultrasound crystallization device 521 and the outlet of the ultrasound crystallization device 521 is connected to the inlet of the ultrasound crystallization device 522. It is, however, also possible that an ultrasound crystallization system according to an exemplifying and non-limiting embodiment of the invention comprises parallel connected ultrasound crystallization devices, series connected groups of parallel connected ultrasound crystallization devices, parallel connected groups of series connected ultrasound crystallization devices, or any other interconnection of ultrasound crystallization devices.

In an ultrasound crystallization system according to an exemplifying and non-limiting embodiment of the invention, the temperature-control system is arranged to control the temperature T3 of the process fluid at the outlet of the ultrasound crystallization device 522 to be lower than the temperature T2 of the process fluid at the outlet of the ultrasound crystallization device 521, i.e. T3<T2, and the temperature T2 of the process fluid at the outlet of the ultrasound crystallization device 521 to be lower than the temperature T1 of the process fluid at the outlet of the ultrasound crystallization device 520, i.e. T2<T1. The temperatures can be controlled in the above-described way in order to create circumstances where the solubility of the substance being crystallized decreases gradually on the path from the inlet of the ultrasound crystallization device 520 to the outlet of the ultrasound crystallization device 522.

In an ultrasound crystallization system according to an exemplifying and non-limiting embodiment of the invention, the temperature-control system 523 is arranged to pump the temperature-control fluid to flow through the temperature-control structure of at least one of the ultrasound crystallization devices 520-523 in a direction providing counter-flow heat transfer between the process fluid and the temperature-control fluid. In an ultrasound crystallization system according to an exemplifying and non-limiting embodiment of the invention, the temperature-control system 523 is arranged to pump the temperature-control fluid to flow through the temperature-control structure of at least one of the ultrasound crystallization devices 520-523 in a direction providing parallel-flow heat transfer between the process fluid and the temperature-control fluid. In the exemplifying situation shown in FIG. 5, the counter-flow heat transfer takes place in the ultrasound crystallization devices 520 and 523 and the parallel-flow heat transfer takes place in the ultrasound crystallization device 521.

The specific examples provided in the description given above should not be construed as limiting. Therefore, the invention is not limited merely to the exemplifying and non-limiting embodiments described above. Lists and groups of examples provided in the description are not exhaustive unless otherwise explicitly stated.

What is claimed is:

1. An ultrasound crystallization device, comprising:
   an inlet for receiving a flow of process fluid containing substance to be crystallized;
   a tubular crystallization reactor arranged to conduct the process fluid between the inlet and an outlet of the crystallization device;
   an ultrasound source for radiating ultrasound to the tubular crystallization reactor; and
   a temperature-control structure for controlling temperature of the process fluid so that the process fluid is in heat transfer relation with temperature-control fluid,
   wherein the tubular crystallization reactor is shaped to conduct the process fluid to flow around the ultrasound source so that a flow path of the process fluid is circulated around the ultrasound source, and
   wherein the temperature-control structure comprises a flow-guide structure for guiding at least a part of the temperature-control fluid to flow around the ultrasound source so that a flow path of the at least part of the temperature-control fluid is circulated around the ultrasound source.

2. The ultrasound crystallization device according to claim 1, wherein the tubular crystallization reactor is a helix-shaped tube surrounding the ultrasound source.

3. The ultrasound crystallization device according to claim 1, wherein the tubular crystallization reactor is a meandering tube surrounding the ultrasound source.

4. The ultrasound crystallization device according to claim 1, wherein the flow-guide structure is arranged to guide the at least part of the temperature-control fluid to flow along a helical path surrounding the ultrasound source.

5. The ultrasound crystallization device according to claim 4, wherein the temperature-control structure comprises a container encompassing the tubular crystallization reactor and the ultrasound source, and the flow-guide structure comprises a helical guide-plate attached to an inner wall of the container and surrounding the tubular crystallization reactor.

6. The ultrasound crystallization device according to claim 1, wherein the flow-guide structure is a heat control pipe inside the tubular crystallization reactor and suitable for conducting the temperature-control fluid.

7. The ultrasound crystallization device according to claim 1, wherein the flow-guide structure is a heat control pipe inside which the tubular crystallization reactor is located, the heat control pipe being suitable for conducting the temperature-control fluid.

8. The ultrasound crystallization device according to claim 1, wherein the ultrasound crystallization device comprises a stabilizer tank between the tubular crystallization reactor and the outlet of the ultrasound crystallization device.

9. The ultrasound crystallization device according to claim 8, wherein the ultrasound crystallization device comprises a mixer for stirring the process fluid contained by the stabilizer tank.

10. The ultrasound crystallization device according to claim 1, wherein the ultrasound source is cylindrical and arranged to radiate the ultrasound via a girthed area of the cylindrical ultrasound source, and the tubular crystallization reactor surrounds the girthed area of the cylindrical ultrasound source so that the tubular crystallization reactor is arranged to conduct the process fluid substantially parallel with the girthed area of the cylindrical ultrasound source and a distance away from the girthed area of the cylindrical ultrasound source.

11. The ultrasound crystallization device according to claim 1, wherein the ultrasound source is arranged to radiate the ultrasound at a frequency belonging to a range from 16 kHz to 100 kHz.

12. The ultrasound crystallization device according to claim 11, wherein the ultrasound source is arranged to radiate the ultrasound at a frequency belonging to a range from 20 kHz to 40 kHz.

13. The ultrasound crystallization device according to claim 1, wherein the ultrasound crystallization device comprises an ultrasound controller for periodically switching the ultrasound source on and off.

14. An ultrasound crystallization system, comprising:
one or more ultrasound crystallization devices, each comprising an inlet for receiving a flow of process fluid containing substance to be crystallized, a tubular crystallization reactor arranged to conduct the process fluid between the inlet and an outlet of the crystallization device, an ultrasound source for radiating ultrasound to the tubular crystallization reactor, and a temperature-control structure for controlling temperature of the process fluid so that the process fluid is in heat transfer relation with temperature-control fluid; and
a temperature-control system for pumping the temperature-control fluid through the temperature-control structure of each of the one or more ultrasound crystallization devices,
wherein the tubular crystallization reactor of each of the one or more ultrasound crystallization devices is shaped to conduct the process fluid to flow around the ultrasound source of the ultrasound crystallization device so that a flow path of the process fluid is circulated around the ultrasound source, and
wherein the temperature-control structure of each of the one or more ultrasound crystallization devices comprises a flow-guide structure for guiding at least a part of the temperature-control fluid to flow around the ultrasound source so that a flow path of the at least part of the temperature-control fluid is circulated around the ultrasound source.

15. The ultrasound crystallization system according to claim 14, wherein the ultrasound crystallization devices are connected in series so that the outlet of a first one of the ultrasound crystallization devices is connected to the inlet of a second one of the ultrasound crystallization devices.

16. The ultrasound crystallization system according to claim 15, wherein the temperature-control system is arranged to control the temperature of the process fluid at the outlet of the second one of the ultrasound crystallization devices to be lower than the temperature of the process fluid at the outlet of the first one of the ultrasound crystallization devices.

17. The ultrasound crystallization system according to claim 14, wherein the temperature-control system is arranged to pump the temperature-control fluid to flow through the temperature-control structure of at least one of the ultrasound crystallization devices in a direction providing counter-flow heat transfer between the process fluid and the temperature-control fluid.

18. The ultrasound crystallization system according to claim 14, wherein the temperature-control system is arranged to pump the temperature-control fluid to flow through the temperature-control structure of at least one of the ultrasound crystallization devices in a direction providing parallel-flow heat transfer between the process fluid and the temperature-control fluid.

19. An ultrasound crystallization device, comprising:
an inlet for receiving a flow of process fluid containing substance to be crystallized;
a tubular crystallization reactor arranged to conduct the process fluid between the inlet and an outlet of the crystallization device;
an ultrasound source for radiating ultrasound to the tubular crystallization reactor; and
a temperature-control structure for controlling temperature of the process fluid so that the process fluid is in heat transfer relation with temperature-control fluid,
wherein the tubular crystallization reactor is shaped to conduct the process fluid to flow around the ultrasound source so that a flow path of the process fluid is circulated around the ultrasound source,
wherein the temperature-control structure comprises a flow-guide structure for guiding at least a part of the temperature-control fluid to flow around the ultrasound source so that a flow path of the at least part of the temperature-control fluid is circulated around the ultrasound source along a helical path surrounding the ultrasound source, and
wherein the temperature-control structure further comprises a container encompassing the tubular crystallization reactor and the ultrasound source, and the flow-guide structure comprises a helical guide-plate attached to an inner wall of the container and surrounding the tubular crystallization reactor.

* * * * *